(12) United States Patent
Jeong et al.

(10) Patent No.: US 10,735,484 B2
(45) Date of Patent: Aug. 4, 2020

(54) TRANSMISSION DEVICE AND METHOD FOR CONTROLLING SAME

(71) Applicant: SAMSUNG ELECTRONICS CO., LTD., Suwon-si (KR)

(72) Inventors: Jong-hoon Jeong, Hwaseong-si (KR); Ki-hyun Choo, Seoul (KR); Eun-mi Oh, Seoul (KR); Sung-chan Kim, Suwon-si (KR); Cheol-hoon Baek, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/752,152

(22) PCT Filed: Aug. 9, 2016

(86) PCT No.: PCT/KR2016/008731
§ 371 (c)(1),
(2) Date: Feb. 12, 2018

(87) PCT Pub. No.: WO2017/026768
PCT Pub. Date: Feb. 16, 2017

(65) Prior Publication Data
US 2018/0241787 A1 Aug. 23, 2018

(30) Foreign Application Priority Data
Aug. 10, 2015 (KR) .................. 10-2015-0112498

(51) Int. Cl.
*H04L 29/06* (2006.01)
*H04N 21/439* (2011.01)
(Continued)

(52) U.S. Cl.
CPC ........ *H04L 65/4069* (2013.01); *G10L 19/167* (2013.01); *G10L 19/22* (2013.01);
(Continued)

(58) Field of Classification Search
CPC ... H04L 65/4069; H04L 65/601; H04L 65/80; H04L 69/04; H04N 19/103;
(Continued)

(56) References Cited

U.S. PATENT DOCUMENTS 7,596,486 B2   9/2009  Ojala et al.
8,036,265 B1 * 10/2011  Reynolds ................ H04L 29/06
                                                              375/240.01
(Continued)

FOREIGN PATENT DOCUMENTS

CN   1860786 A   11/2006
CN   1954367 A    4/2007
(Continued)

OTHER PUBLICATIONS

International Search Report dated Nov. 8, 2016 by the International Searching Authority in counterpart International Application No. PCT/KR2016/008731 (PCT/ISA/210).
(Continued)

*Primary Examiner* — Kristie D Shingles
(74) *Attorney, Agent, or Firm* — Sughrue Mion, PLLC

(57) ABSTRACT

Provided are a transmission device for transmitting a data signal to a reception device and a method for controlling the same. The present method for controlling a transmission device comprises; receiving function module information related to a codec supported by a reception device from the reception device while pairing with the reception device is performed; encoding a data signal on the basis of the received function module information; and transmitting the encoded data signal to the reception device.

11 Claims, 17 Drawing Sheets

(51) Int. Cl.
*H04N 19/00* (2014.01)
*H04N 21/485* (2011.01)
*G10L 19/22* (2013.01)
*H04N 19/103* (2014.01)
*H04N 19/164* (2014.01)
*G10L 19/16* (2013.01)
*H04N 21/233* (2011.01)

(52) U.S. Cl.
CPC ............ *H04L 65/601* (2013.01); *H04L 65/80* (2013.01); *H04N 19/00* (2013.01); *H04N 19/103* (2014.11); *H04N 19/164* (2014.11); *H04N 21/233* (2013.01); *H04N 21/439* (2013.01); *H04N 21/4852* (2013.01); *H04L 69/04* (2013.01)

(58) Field of Classification Search
CPC .... H04N 19/164; H04N 19/00; H04N 21/233; H04N 21/439; H04N 21/4852; G10L 19/167; G10L 19/22
USPC ........................................................ 709/231
See application file for complete search history.

(56) References Cited

U.S. PATENT DOCUMENTS

| | | |
|---|---|---|
| 8,176,197 B2 | 5/2012 | Oishi |
| 8,254,837 B2 | 8/2012 | Tian et al. |
| 8,929,297 B2 | 1/2015 | Raveendran |
| 9,008,580 B2 | 4/2015 | Kumar |
| 2004/0045030 A1* | 3/2004 | Reynolds ................ H04L 29/06 725/110 |
| 2005/0261900 A1 | 11/2005 | Ojala et al. |
| 2007/0022459 A1* | 1/2007 | Gaebel, Jr. ............. H04N 7/165 725/114 |
| 2009/0193485 A1* | 7/2009 | Rieger ............... H04N 21/2402 725/114 |
| 2012/0230397 A1* | 9/2012 | Ouedraogo ............ H04N 19/70 375/240.03 |
| 2014/0067405 A1 | 3/2014 | Patel et al. |
| 2014/0098851 A1 | 4/2014 | Chen et al. |
| 2014/0314155 A1 | 10/2014 | Neff et al. |
| 2015/0162015 A1 | 6/2015 | Hillyard et al. |
| 2015/0181306 A1 | 6/2015 | Innes et al. |
| 2015/0201041 A1 | 7/2015 | Wang |
| 2016/0277522 A1* | 9/2016 | Singh .................. H04L 67/2842 |

FOREIGN PATENT DOCUMENTS

| | | |
|---|---|---|
| CN | 101420290 A | 4/2009 |
| JP | 2014-11702 A | 1/2014 |
| KR | 10-2014-0031051 A | 3/2014 |
| KR | 10-2015-0065838 A | 6/2015 |

OTHER PUBLICATIONS

Written Opinion dated Nov. 8, 2016 by the International Searching Authority in counterpart International Application No. PCT/KR2016/008731 (PCT/ISA/237).
Communication dated Mar. 4, 2020 issued by the State Intellectual Property Office of P.R. China in counterpart Chinese Application No. 201680047432.5.

* cited by examiner

FIG. 7B

| TYPE | FUNCTION MODULE | | | | | |
|---|---|---|---|---|---|---|
| | A | B | C | D | E | F |
| BASIC ENCODING MODE | On | On | On | Off | Off | Off |
| HIGH QUALITY ENCODING MODE | On | On | On | On | On | On |

FIG. 9A

| Octet-0 | Length Of Service Capability | | | | | | | |
|---|---|---|---|---|---|---|---|---|
| Octet-1 | Media type (0x00 = audio) | | | | | | | |
| Octet-2 | Media codec type (0xFF = Vendor Codec) | | | | | | | |
| Octet-3 | Vendor ID | | | | | | | |
| Octet-4 | | | | | | | | |
| Octet-5 | | | | | | | | |
| Octet-6 | | | | | | | | |
| Octet-7 | Codec ID | | | | | | | |
| Octet-8 | Function Module Info | | | | | | | |
| Octet-9 | 96kHz | 32kHz | 44.1kHz | 48kHz | mono | | stereo | additional info |

910 — Codec ID
920 — Function Module Info

FIG. 9B

| TYPE | Codec Module Info (Octet-8) | | | | | | | |
|---|---|---|---|---|---|---|---|---|
| | bit 7 | bit 6 | bit 5 | bit 4 | bit 3 | bit 2 | bit 1 | bit 0 |
| BASIC SOUND QUALITY MODE | reserved (0x0) | | | | | | | off |
| HIGH SOUND QUALITY MODE | reserved (0x0) | | | | | | | on |

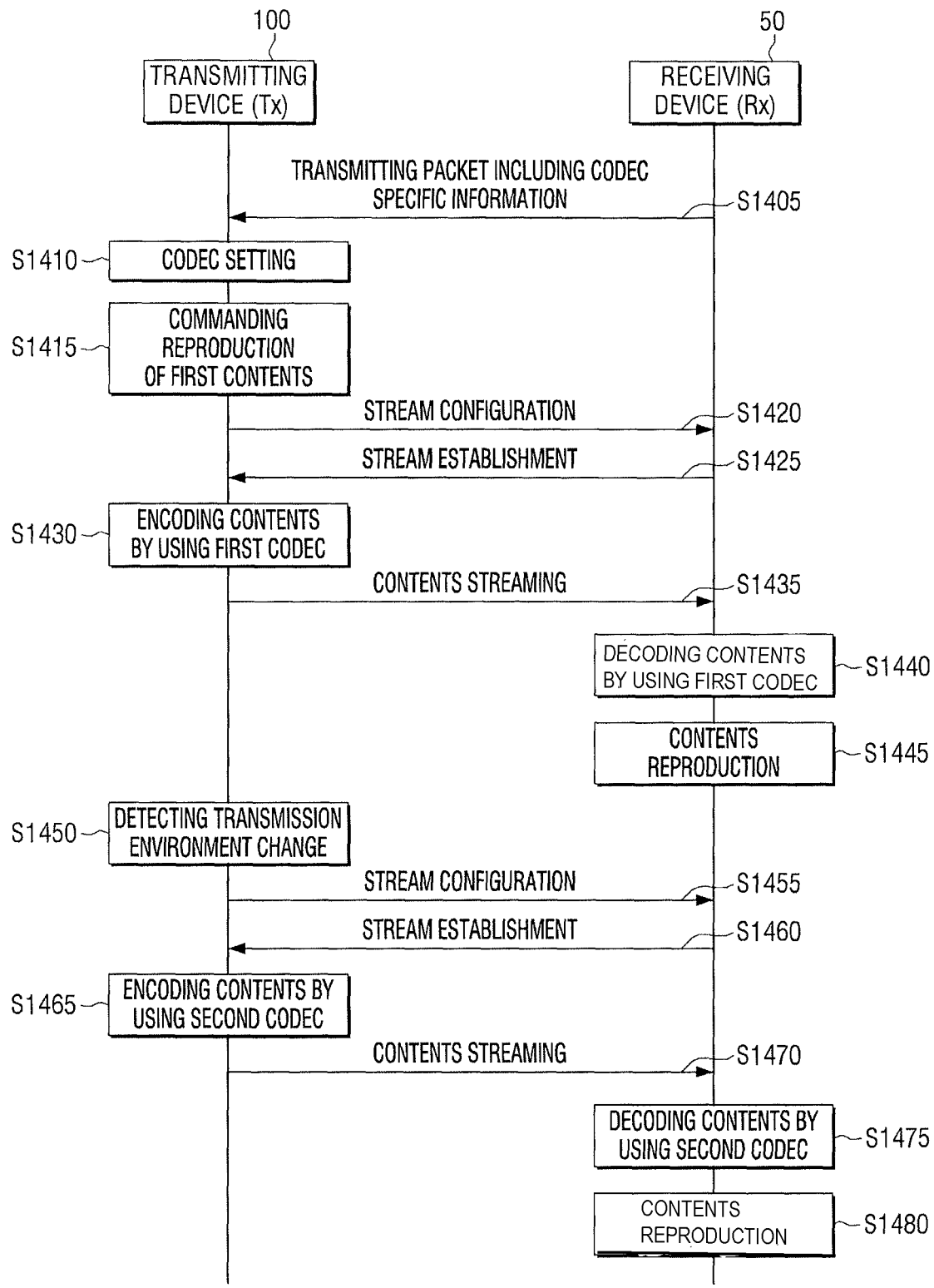

US 10,735,484 B2
TRANSMISSION DEVICE AND METHOD FOR CONTROLLING SAME

FIELD OF THE INVENTION

Devices and methods consistent with what is disclosed herein relate to a transmitting device and a method for controlling the same, and more particularly, to a transmitting device that encodes a data signal and transmits the encoded data signal to a receiving device and a method for controlling the same.

DESCRIPTION OF THE RELATED ART

With the development of communication technology, a large-capacity data signal is transmitted or received via wireless communication. For example, in a Bluetooth environment, a smartphone encodes an audio signal of normal sound quality (e.g. HD audio (48 kHz/16 bit)) and streams the encoded audio signal to a wireless headphone, so that a user is able to listen to audio sound of normal sound quality by using the wireless headphone.

Recently, the research and development has been ongoing regarding the technology of streaming an audio signal of high sound quality (e.g. UHQ audio (96 kHz/24 bit)) to an outside via the wireless communication. Streaming the audio signal of high sound quality to the outside requires a codec for more efficient compression of the audio signal of high sound quality and a wireless transmission system.

Particularly, a codec for compressing a data signal may further include a new function module for more efficient compression of data. However, in the conventional technology, although a new function module is added to a codec of a transmitting device or a receiving device, the transmitting device and the receiving device are not able to confirm specific information of a function module of the other. As a result, the problem arises that a function of a newly added function module is not supported.

In the case where a new function module is added to the codec supported by the transmitting device or the receiving device, in the conventional technology, a function module is not newly added to the existing codec, but a new codec is generated. In this case, an access time increases due to an increase in the amount of pairing information exchanged by the transmitting device and the receiving device in a pairing process.

In the case where the function module of the codec supported by the transmitting device or the receiving device expands, a search for a solution is required to improve the compatibility between the transmitting device and the receiving device.

SUMMARY

An aspect of the exemplary embodiments relates to a transmitting device configure to receive function module information with regard to a codec supported by a receiving device and encode a data signal based on function module information and a method for controlling the same.

According to an exemplary embodiment, there is provided a controlling method for a transmitting device that transmits a data signal to a receiving device including receiving function module information with regard to a codec supported by the receiving device from the receiving device while performing paring with the receiving device, encoding a data signal based on the received function module information, and transmitting the encoded data signal to the receiving device.

The function module information may include at least one of information related to a plurality of function modules constituting the codec supported by the receiving device and operation information related to operations of the plurality of function modules according to an encoding mode.

The encoding may include determining a function module commonly supported by the transmitting device and the receiving device based on the function module information, and encoding the data signal based on the determined function module.

The encoding may further include selecting at least one of determined function modules based on user settings, a status of the transmitting device and a type of content, and encoding the data signal based on the selected function module.

The plurality of function modules constituting the codec supported by the receiving device may include at least one of a basic function module for a first function and an advanced function module for the first function, and the method may further include determining an encoding mode depending on whether the basic function module and the advanced function module are supported.

The determining may include, in response that both the receiving device and the transmitting device include an advanced function module, determining an encoding mode as a first mode for performing encoding by using the advanced function module, and in response that at least one of the receiving device and the transmitting device does not include an advanced function module, determining an encoding mode as a second mode for performing encoding by using the basic function module.

The receiving may include receiving ID information with regard to the codec supported by the receiving device from the receiving device along with the function module information, and the determining may include determining an encoding mode based on the received ID information with regard to the codec.

The determining may further include, in response that the received ID information with regard to the codec is a predetermined first ID, determining an encoding mode as a first mode regardless of whether a basic function module and an advanced function module are supported, and in response that the received ID information with regard to the codec is a predetermined second ID, determining the encoding mode as one of the first mode and a second mode depending on whether the basic function module and the advanced function module are supported.

The method may further include in response that a bandwidth for transmitting the encoded data signal is reduced to a predetermined value or less while a data signal encoded by using a first codec is transmitted to the receiving device, encoding the data signal by using a second codec, and transmitting the data signal encoded by using the second codec to the receiving device.

The first codec may be a codec for providing UHQ sound quality, and the second codec may be a codec for providing HD sound quality.

According to an exemplary embodiment, there is provided a transmitting device for transmitting a data signal to a receiving device including a communicator configured to perform communication with the receiving device, an encoder configured to encode a data signal, and a controller configured to control the communicator to receive function module information with regard to a codec supported by the receiving device from the receiving device while performing pairing with the receiving device, control the encoder to encode a data signal based on the received function module information, and control the communicator to transmit the encoded data signal to the receiving device.

The function module information may include at least one of information related to a plurality of function modules constituting the codec supported by the receiving device and operation information related to operations of the plurality of function modules according to an encoding mode.

The controller may be further configured to determine a function module commonly supported by the transmitting device and the receiving device based on the function module information and control the encoder to encode the data signal based on the determined function module.

The controller may be further configured to select at least one of determined function modules based on user settings, a status of the transmitting device and a type of content and control the encoder to encode the data signal based on the selected function module.

The plurality of function modules constituting the codec supported by the receiving device may comprises at least one of a basic function module for a first function and an advanced function module for the first function, and the controller may be further configured to determine an encoding mode depending on whether the basic function module and the advanced function module are supported.

The controller may be further configured to, in response that both the receiving device and the transmitting device include an advanced function module, determine an encoding mode as a first mode for performing encoding by using the advanced function module, and in response that at least one of the receiving device and the transmitting device does not include an advanced function module, determine an encoding mode as a second mode for performing encoding by using the basic function module.

The controller may be further configured to control the communicator to receive ID information with regard to the codec supported by the receiving device from the receiving device along with the function module information and determine an encoding mode based on the received ID information with regard to the codec.

The controller may be further configured to, in response that the received ID information with regard to the codec is a predetermined first ID, determine the encoding mode as a first mode regardless of whether a basic function module and an advanced function module are supported, and in response that the received ID information with regard to the codec is a predetermined second ID, determine the encoding mode as one of the first mode and a second mode depending on whether the basic function module and the advanced function module are supported.

The plurality of function modules constituting the codec supported by the receiving device may include at least one of a basic function module for a first function and an advanced function module for the first function, and the controller may determine an encoding mode depending on whether the basic function module and the advanced function module are supported.

BRIEF DESCRIPTION OF THE DRAWINGS

FIGS. 7A to 8 are view provided to explain embodiments of performing an encoding mode according to function module information according to an embodiment of the present disclosure;

FIGS. 9A and 9B are views provided to explain codec specific information according to an embodiment of the present disclosure;

FIG. 14 is a sequence view provided to explain a controlling method for a multimedia system according to another embodiment of the present disclosure.

DETAILED DESCRIPTION OF EXEMPLARY EMBODIMENTS

Figure 1:
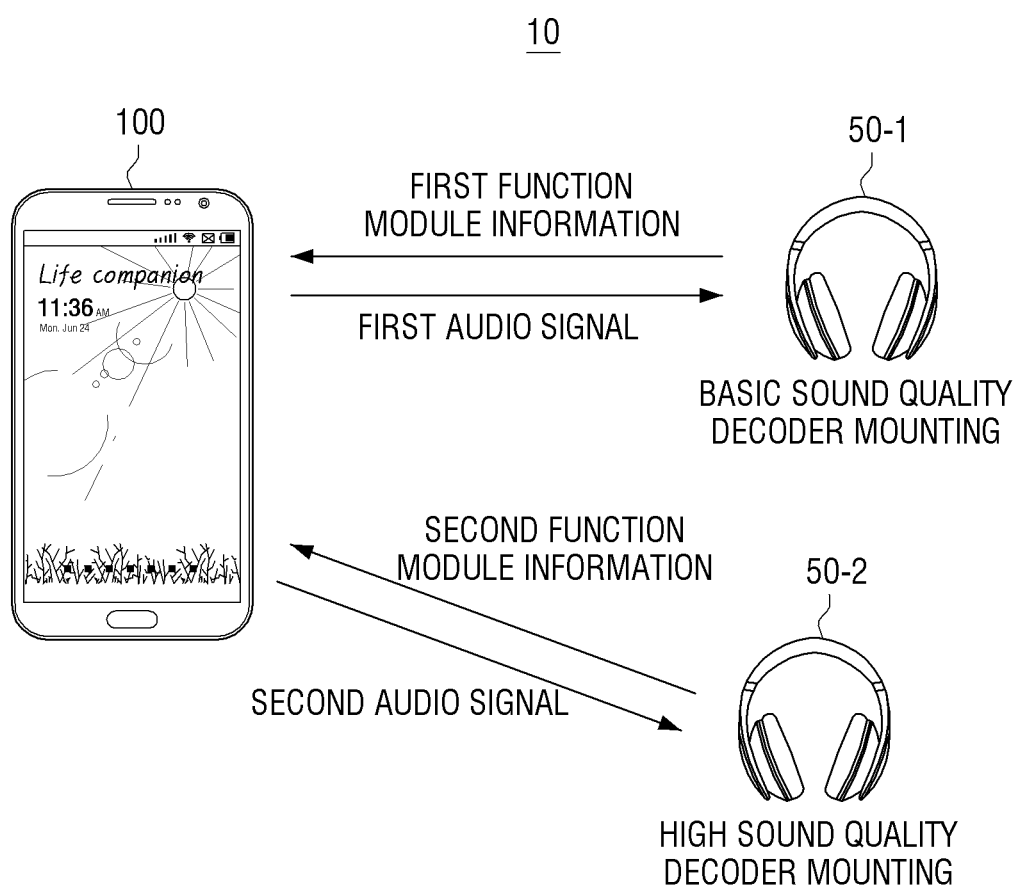
FIG. 1 is a view illustrating a multimedia system including a transmitting device and a receiving device according to an embodiment of the present disclosure.

The terms used in the embodiments of the present disclosure will be briefly described, and these embodiments will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The term such as "first" and "second" used in various example embodiments may modify various elements regardless of an order and/or importance of the corresponding elements, and does not limit the corresponding elements. The terms are used simply to distinguish one element from other elements. For example, the first element may be referred to as the second element and similarly, the second element may be referred to as the first element without going beyond the scope of rights of the present disclosure. The term of "and/or" includes combination of a plurality of related item of one of the plurality of related items.

According to an embodiment, singular forms are intended to include plural forms unless the context clearly indicates otherwise.

The terms used in the application are merely used to describe particular exemplary embodiments, and are not intended to limit the invention. Singular forms in the invention are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module and may be realized as at least one processor except for 'modules', 'units' or 'parts' that should be realized in a specific hardware.

Particularly, according to an embodiment, a "function module" may refer to software or hardware for performing a specific function with regard to encoding or decoding of a specific codec or a combination thereof. For example, the function module may include a "pre-filter" function module, a "post-filter" function module, a "predictor" function module, a "transform" function module, a "quantization" function module, and the like, but the present disclosure is not limited thereto.

When an element is referred to as being "connected" or "coupled" to another element, it can be electrically connected or coupled to the another element with one or more intervening elements interposed therebetween.

Hereinafter, the present disclosure will be described in more detail with reference to the drawings. FIG. 1 is a view illustrating a multimedia system including a transmitting device and a receiving device according to an embodiment of the present disclosure. A multimedia system 10 may include a transmitting device 100 for transmitting a data signal and a receiving device 50 for receiving and outputting a data signal. According to an embodiment, as shown in FIG. 1, the transmitting device 100 may be a smartphone, and the receiving device 50 may be a wireless headphone. However, the transmitting device 100 may be embodied as various electronic devices providing multimedia data signals (e.g. a TV, a desktop PC, a notebook PC, a table PC, and the like), and the receiving device 50 may be embodied as various electronic devices (e.g. a home theater, a speaker, and the like) receiving and outputting the multimedia data signals.

The transmitting device 100 may encode data signals (e.g. an audio signal and/or a video signal) and transmit the encoded data signals to the receiving device 50. The receiving device 50 may decode the encoded data signals and output the decoded data signals. The transmitting device 100 may perform encoding of data signals so that data signals of different quality may be generated according to a performance of a decoder mounted in the receiving device 50. For example, in the case where a first receiving device 50-1 includes a decoder configured to decode au audio signal of normal sound quality (e.g. HD sound quality), the transmitting device 100 may encode au audio signal of normal sound quality to the first receiving device 50-1, and in the case where a second receiving device 50-2 includes a decoder configured to decode an audio signal of high sound quality, the transmitting device 100 may encode an audio signal of high sound quality to the second receiving device 50-2.

In order for the transmitting device 100 to confirm a performance of the decoder mounted in the receiving device 50, the receiving device 50 may confirm information related to a codec supported by the receiving device 50. According to an embodiment, the transmitting device 100 may receive function module information related to the codec supported by the receiving device from the receiving device 50 while performing pairing with the receiving device 50.

Figure 2:
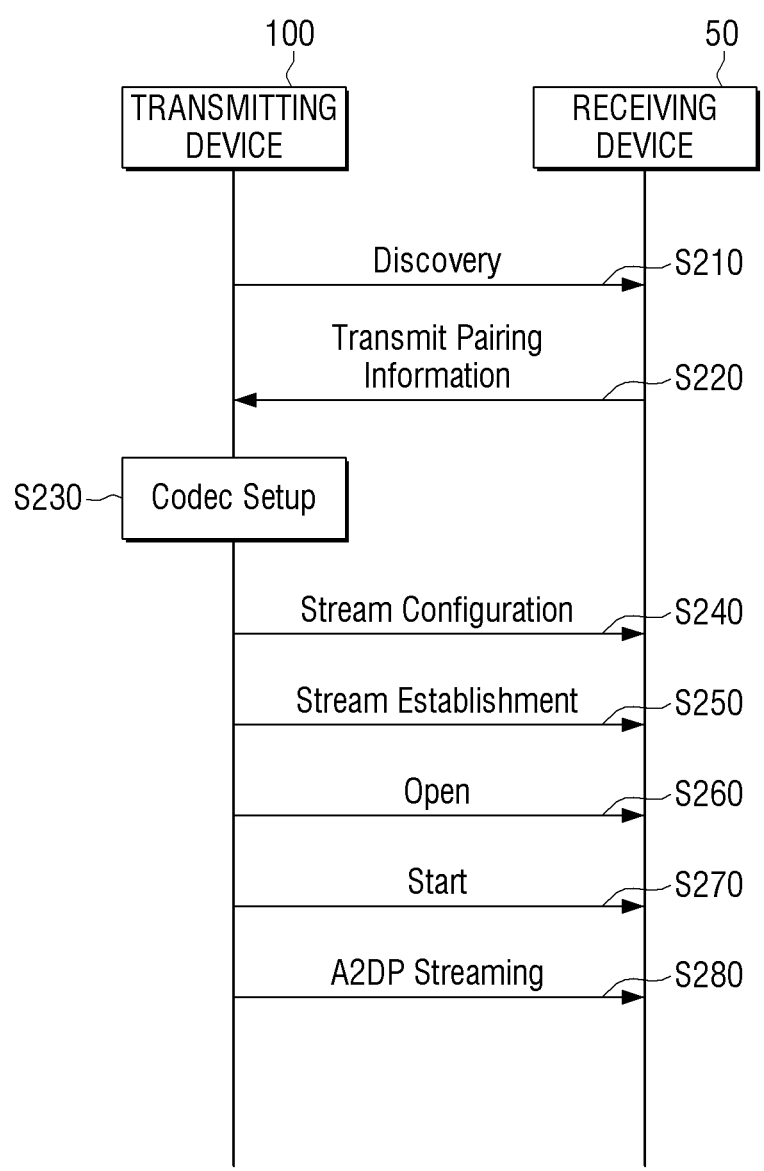
FIG. 2 is a sequence view provided to explain a process of pairing between a transmitting device and a receiving device according to an embodiment of the present disclosure.

The process of performing pairing of the transmitting device 100 to confirm the information related to the codec supported by the receiving device 50 will be described with reference to FIG. 2. FIG. 2 illustrates that the transmitting device 100 and the receiving device 50 perform pairing through a Bluetooth communication module, but the technical spirit of the present disclosure could be applied to other communication modules.

The transmitting device 100 may discover the receiving device 50 through a Stream End Point Discovery procedure at step S210.

The transmitting device 100 may receive pairing information from the discovered receiving device 50 at step S220. The pairing information may include codec specific information including function module information related to a function module constituting the codec supported by the receiving device 50. Therefore, the transmitting device 100 may obtain the function module information.

The transmitting device 100 may determine a codec for encoding based on the received function module information included in the codec specific information at step S230. The method of how the transmitting device 100 determines a codec based on the function module information will be described in detail below.

The transmitting device 100 may perform a stream configuration procedure for connecting a streaming channel to transmit and receive data signals at step S240.

The transmitting device 100 may perform a stream establishment procedure for ensuring a streaming channel at step S250.

The transmitting device 100 may perform an Open procedure for connecting a streaming channel which transmits media stream to between the transmitting device 100 and the receiving device 50 at step S260.

The transmitting device 100 may transmit data signals through a streaming channel at step S270 and perform A2DP streaming at step S280.

As described above, in the process of pairing of Bluetooth communication, the transmitting device 100 may obtain information on a function module constituting the codec supported by the receiving device 50 from the receiving device 50. The receiving device 50 may also obtain information on a function module constituting a codec supported by the transmitting device 100.

In response to the transmitting device 100 obtaining the function module information through the above-described procedure, the transmitting device 100 may determine a codec based on the function module information and perform encoding. For example, in response to the transmitting device 100 obtaining first function module information from the first receiving device 50-1, the transmitting device 100 may determine a codec based on first function module information, perform encoding of an audio signal, generate the encoded first audio signal, and transmit the encoded first audio signal to the first receiving device 50-1. In response to the transmitting device 100 obtaining second function module information from the second receiving device 50-2, the transmitting device 100 may determine a codec based on the second function module information, perform encoding of an audio signal, generate the encoded second audio signal and transmit the encoded second audio signal to the second receiving device 50-2.

In other words, the transmitting device 100 may provide data signals of different quality to a plurality of receiving devices 50 by performing encoding based on function module information received from each of the receiving devices 50-1 and 50-2. In addition, although a function module of the codec supported by the receiving device 50 expands, the transmitting device 100 may perform encoding including a function corresponding to the expanded function module based on the function module information received from the receiving device 50.

Figure 3:
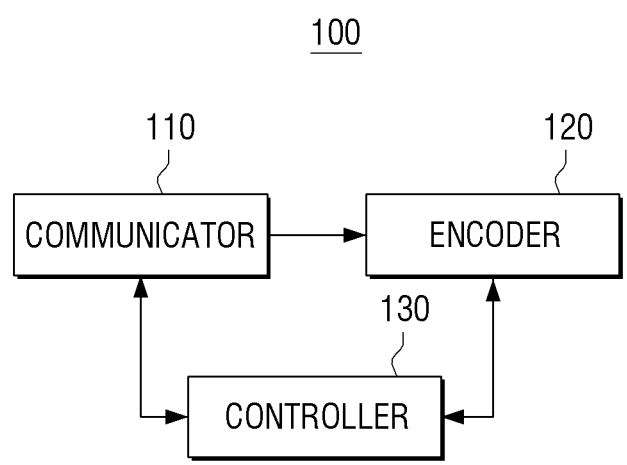
FIG. 3 is a block diagram illustrating configuration of a transmitting device according to an embodiment of the present disclosure.

FIG. 3 is a block diagram illustrating configuration of a transmitting device according to an embodiment of the present disclosure. As shown in FIG. 3, the transmitting device 100 may include a communicator 110, an encoder 120 and a controller 130.

The communicator 110 may perform communication with the external receiving device 50. Specifically, the communicator 110 may receive information related to a function module constituting the codec supported by the receiving device 50 from the external receiving device 50 while performing pairing. The communicator 110 may transmit the data signal encoded by the encoder 120 to the receiving device 50.

According to an embodiment, the communicator 110 may perform communication with the receiving device 50 through a Bluetooth communication module, but the present disclosure is not limited thereto, but the communicator 110 may perform communication with the receiving device 50 through another communication module (e.g. a WiFi communication module, a Zigbee communication module, etc.). The communicator 110 may include a plurality of communication modules, not a single communication module.

The encoder 120 may perform encoding of a data signal to be transmitted to the receiving device 50. The encoder 120 may perform encoding by using a function module determined according to a control of the controller 130.

The encoder 120 according to an embodiment may perform encoding by using various codecs such as a Bluetooth basic codec (an SBC codec), an optional codec (e.g., an MP3), a vendor codec (e.g. an APT-X), and the like.

The controller 130 may control overall operations of the transmitting device 100. The controller 130 may control the encoder 120 to perform encoding of a data signal based on the function module information received through the communicator 110 and control the communicator 110 to transmit the encoded data signal. The function module information received from the receiving device 50 may include at least one of information related to a plurality of function modules constituting the codec supported by the receiving device 50 and operation information related to operations of the plurality of function modules according to an encoding mode.

Specifically, the controller 130 may confirm a function module constituting the codec supported by the receiving device 50 based on the function module information received from the receiving device 50. The controller 130 may determine a function module commonly supported by the transmitting device 100 and the receiving device 50 and control the encoder 120 to encode the data signal based on the determined function module. For example, in the case where function modules commonly supported by the transmitting device 100 and the receiving device 50 are a "function module A" and a "function module B", the controller 130 may control the encoder 120 to encode a data signal by using the "function module A" and the "function module B"

The controller 130 may select at least one of function modules determined based on the user settings, the status of transmitting device and the type of content and control the encoder 120 to encode a data signal based on the selected function module. For example, when a user sets a mode for not using a function of the "function module A", the controller 130 may control the encoder 120 to encode a data signal using the "function module B", not the "function module A", both of which are commonly supported by the transmitting device 100 and the receiving device 50.

When the plurality of function modules constituting the codec supported by the receiving device 50 include at least one of a basic function module for a first function and an advanced function module for the first function, that is, when the plurality of function modules include a basic function module and an advanced function module with regard to a similar function, the controller 130 may determine an encoding mode depending on whether the transmitting device 100 and the receiving device 50 support a basic function module and an advanced function module.

Specifically, when both the receiving device 50 and the transmitting device 100 include advanced function modules, the controller 130 may determine an encoding mode as a first mode for performing encoding by using the advanced function module, and when at least one of the receiving device 50 and the transmitting device 100 does not include the advanced function module, the controller 130 may determine an encode mode as a second mode for performing encoding by using the basic function module.

According to another embodiment, the controller 130 may select an encoding mode based on the received ID information related to the codec.

The controller 130 may control the communicator 110 to receive the ID information on the codec supported by the receiving device 50 from the receiving device 50. When the received ID information on the codec is a predetermined first ID, the controller 130 may determine an encoding mode as the first mode regardless of whether the basic function module and the advanced function module are supported. When the received ID information on the codec is a predetermined second ID, the controller 130 may determine an encoding mode as one of the first and second modes depending on whether the basic function module and the advanced function module are supported.

Figure 4:
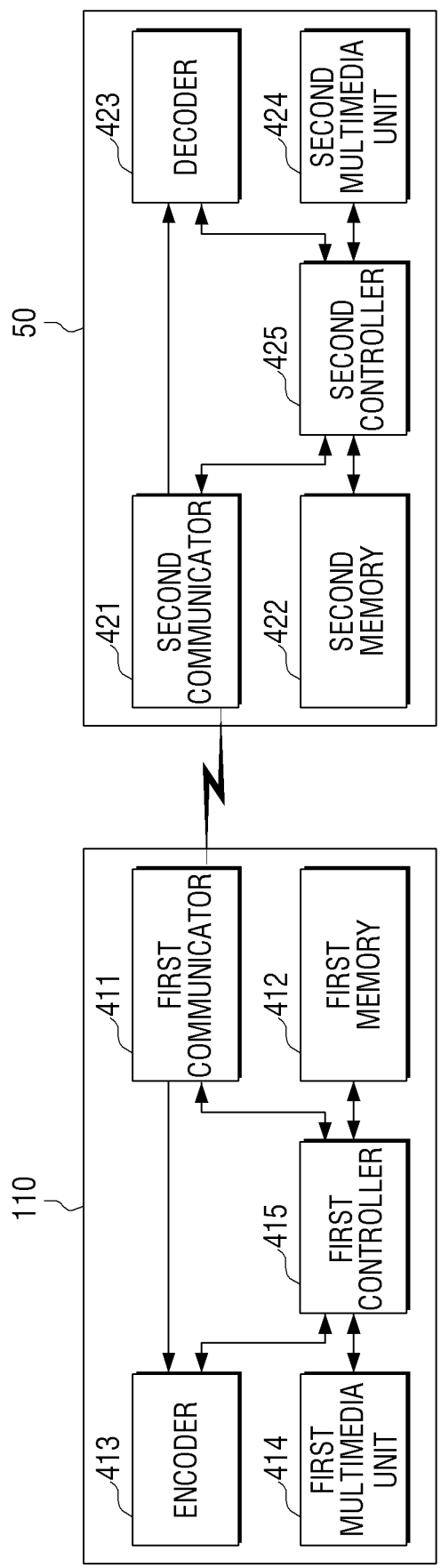
FIG. 4 is a block diagram illustrating configuration of a transmitting device and a receiving device according to an embodiment of the present disclosure.

FIG. 4 is a block diagram illustrating configuration of a transmitting device and a receiving device according to an embodiment of the present disclosure. As shown in FIG. 4, the transmitting device 100 may include a first communicator 411, a first memory 412, an encoder 413, a first multimedia unit 414 and a first controller 415, and the receiving device 50 may include a second communicator 421, a second memory 422, a decoder 423, a second multimedia unit 424 and a second controller 425.

The first communicator 411 may perform communication with the second communicator 421 of the receiving device 50. The first communicator 411 may receive codec specific information from the second communicator 412 during a process of pairing of Bluetooth communication. The codec specific information may include function module information related to the function module constituting the codec supported by the receiving device 50.

The first communicator 411 may stream the encoded data signal to the second communicator 412 via the Bluetooth communication.

The first memory 412 may store various data and programs for controlling the transmitting device 100. The first memory 412 may store information on the function module constituting the codec supported by the transmitting device 100. The first memory 412 may store a multimedia data signal.

The encoder 413 may perform encoding of a data signal by using the function module of the codec set by the first controller 415. For example, when the first controller 415 sets the "function module A" and the "function module B" through codec setting, the encoder 413 may perform encoding of a data signal by using the "function module A" and the "function module B".

The first multimedia unit 414 may output a multimedia data signal. The first multimedia unit 414 may include a display for outputting an image signal and a speaker for outputting an audio signal.

The first controller 415 may control overall operations of the transmitting device 100. The first controller 415 may be embodied with various hardware such as a processor, a CPU, a GPU, and the like.

The first controller 415 may select a function module used when the encoder 413 performs encoding of a data signal based on the function module information of the receiving device 50 received through the first communicator 411.

The first controller 415 may determine a function module used for performing encoding based on the user settings, the status of system, and the type of content. For example, a function module may be determined according to a method stated below.

module_setting={Encoder_module AND Decoder_module} AND User_setting

The first controller 415 may determine an encoding mode of the encoder 413 based on the function module information of the receiving device 50. For example, both the transmitting device 100 and the receiving device 50 support an advanced function module, the first controller 415 may control the encoder 413 to perform encoding of a data signal in an advanced encoding mode for performing encoding by using an advanced function module. When at least one of the transmitting device 100 and the receiving device 50 does not support the advanced function module, the first controller 415 may control the encoder 413 to perform encoding of a data signal in a basic encoding mode for performing encoding by using the basic function module.

A method of selecting a function module for encoding and setting of an encoding mode will be described in detail with reference to FIGS. 5 to 9B below.

The second communicator 421 may perform communication with the first communicator 411 of the transmitting device 100. The second communicator 421 may transmit codec specific information to the first communicator 411 during a pairing process of Bluetooth communication. The codec specific information may include function module information on the function module constituting the codec supported by the receiving device 50.

The second communicator 421 may receive the data signal encoded to the first communicator 411 via the Bluetooth communication.

The second memory 422 may store various data and programs for controlling the receiving device 50. The second memory 422 may store information on the function module constituting the codec supported by the receiving device 50.

The decoder 423 may perform decoding of the data signal streamed from the transmitting device 100. The decoder 423 may perform decoding of the data signal by using the function module of the codec determined by the second controller 425.

The second multimedia unit 424 may output the decoded data signal. When the data signal is au audio signal, the second multimedia unit 424 may be embodied as a speaker that outputs the decoded audio signal, but the present disclosure is not limited thereto.

The second controller 425 may determine a function module required for decoding based on the information on the function module constituting the codec supported by the transmitting device 100 received from the transmitting device 100.

Referring to FIGS. 5 to 9B, a method of selecting a function module for encoding and setting an encoding mode will be described in detail below.

The first controller 415 may compare a function module supported by the transmitting device 100 with a function module supported by the receiving device 50, and as a result of comparison, a function module supported by both the transmitting device 100 and the receiving device 50 may be determined as a function module required for encoding.

Figure 5:
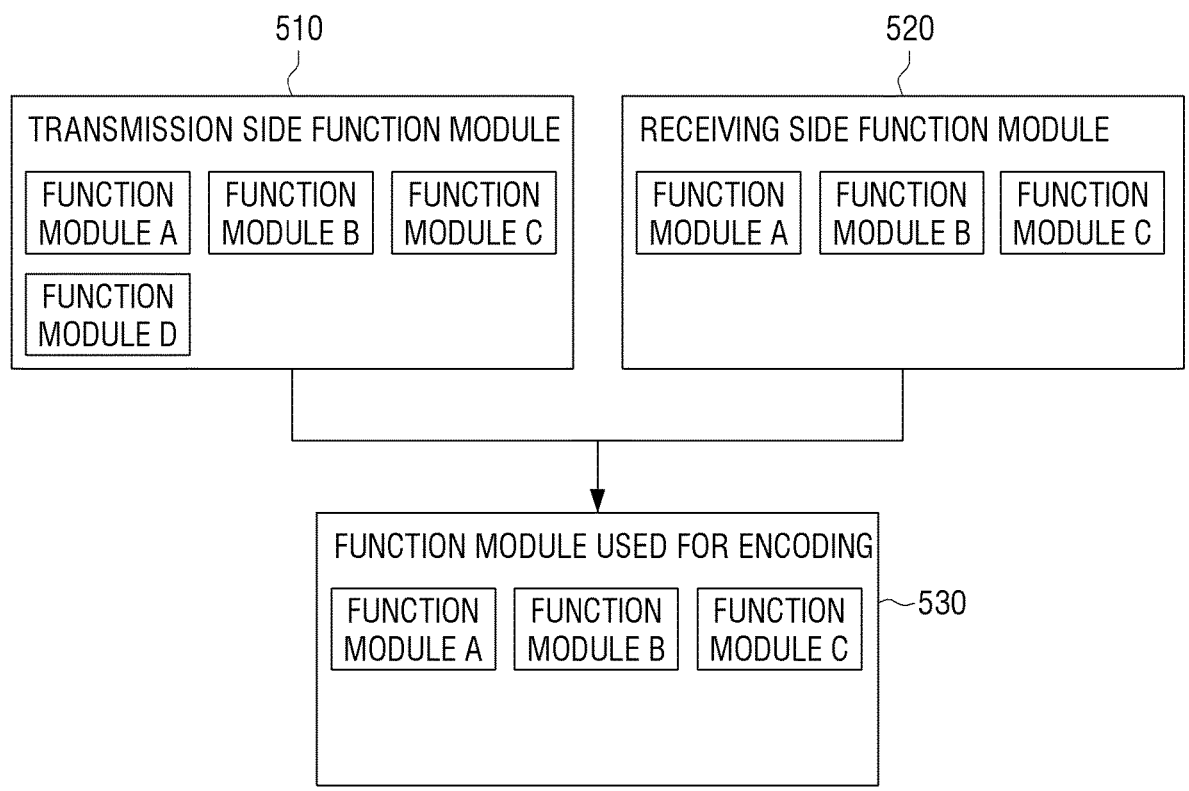
FIGS. 5 to 6B are views provided to explain embodiments of performing encoding based on function module information according to various embodiments of the present disclosure.

For example, as shown in FIG. 5, when a function module 510 supported by the transmitting device 100 is a "function module A", a "function module B", a "function module C" and a "function module D", and when a function module 520 supported by the receiving device 50 is a "function module A", a "function module B" and a "function module C", the first controller 415 may determine a function module 530 used for encoding as the "function module A", the "function module B" and the "function module C".

According to another embodiment, when a basic function module and an advanced function module are provided for performing a specific function, the first controller 415 may analyze the basic function module and the advanced function module supported by the transmitting device 100 and the receiving device 50 and determine a function module used for encoding. The basic function module and the advanced function provided for performing a specific function may have the similar function, but the functions or quality thereof may be different. For example, both the basic function module and the advanced function module may perform a filtering function, but a frequency band where a filtering operation is performed is different, and thus audio data of different quality may be encoded.

Figure 6A:
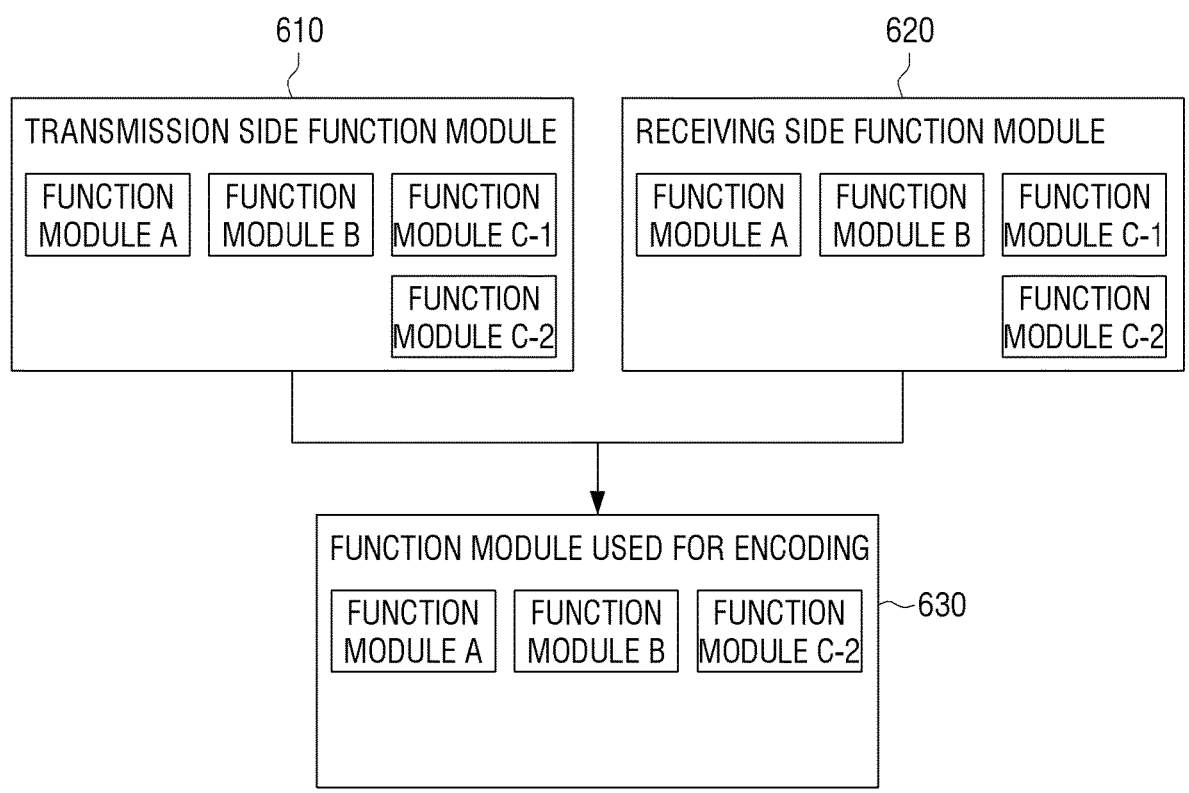

For example, when assuming that a "function module C-1" is a basic function module for a specific function, and a "function module C-2" is an advanced function module for the specific function, as shown in FIG. 6A, a function module 610 supported by the transmitting device 100 may be a "function module A", a "function module B", a "function module C-1" and a "function module C-2", and when a function module 620 supported by the receiving device 50 is a "function module A", a "function module B", a "function module C-1" and a "function module C-2", the first controller 415 may determine a function module 630 used for encoding as the "function module A", the "function module B", and the "function module C-2".

Figure 6B:
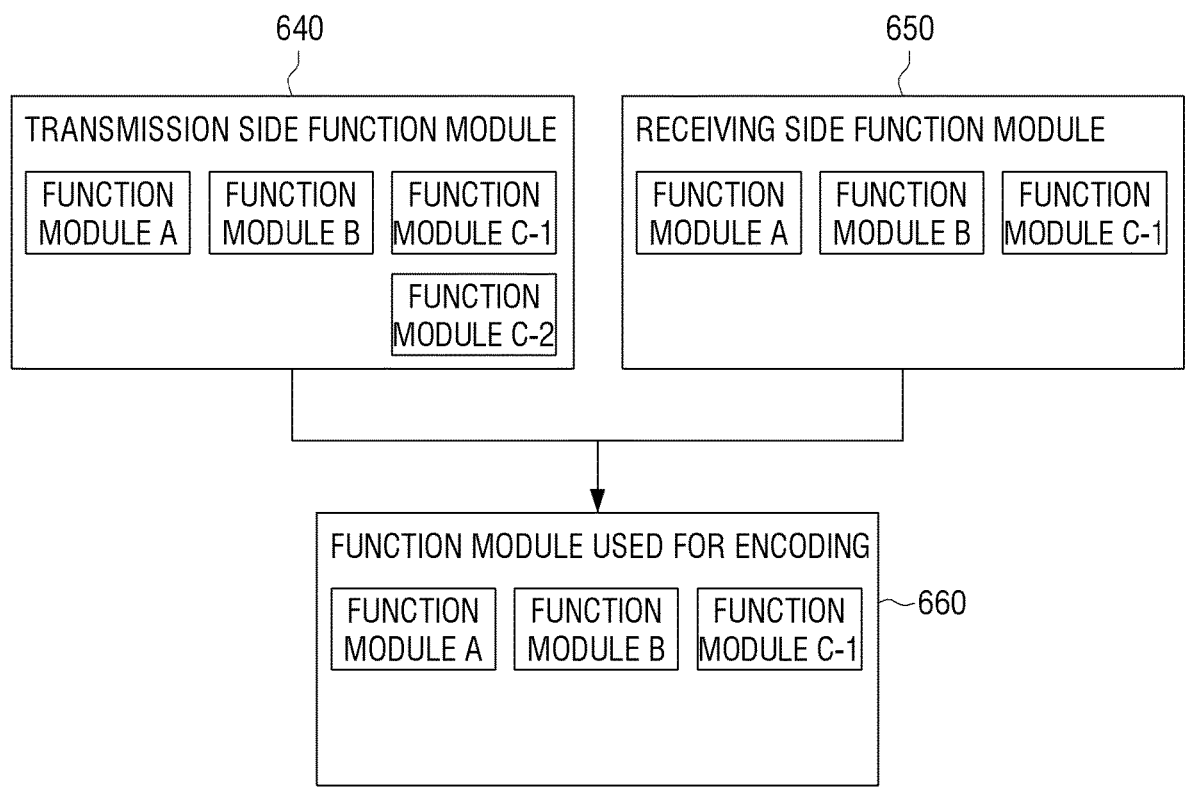

However, as shown in FIG. 6B, when a function module 640 supported by the transmitting device 100 is a "function module A", a "function module B", a "function module C-1" and a "function module C-2", and when a function module 650 supported by the receiving device 50 is a "function module A", a "function module B", and a "function module C-1", the first controller 415 may determine a function module 660 used for encoding as the "function module A", the "function module B", and the "function module C-1".

In other words, when both the receiving device 50 and the transmitting device 100 support an advanced function module, the first controller 415 may set a function module used for encoding to an advanced function module and control the encoder 413 to perform encoding based on a first mode (or an advanced encoding mode). However, when at least one of the receiving device 50 and the transmitting device 100 does not support an advanced function module, the first controller 415 may determine a function module used for encoding as a basic function module and control the encoder 413 to perform encoding based on a second mode (a basic encoding mode).

As shown in FIGS. 6A and 6B, a function module may include a basic function module and an advanced function module that provide a similar function, but the present disclosure is not limited thereto. The function module may include a basic function module basically required for encoding and an advanced function module for an enhanced function.

Figure 7A:
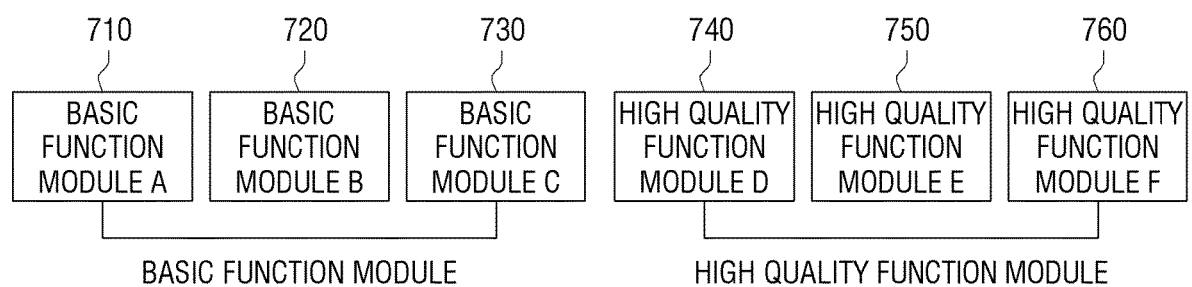
Figure 8:
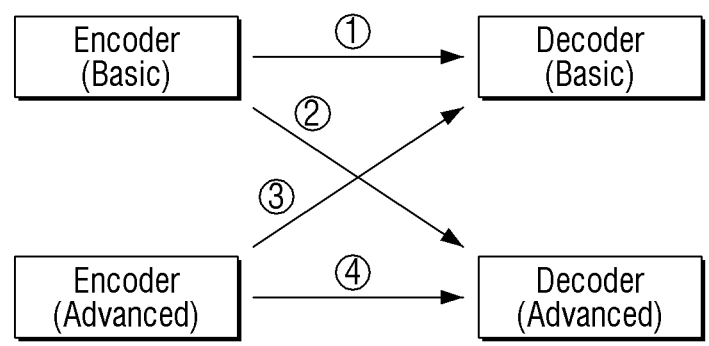

Specifically, as shown in FIG. 7A, the basic function module may include a basic function module A (e.g. a transform module) 710, a basic function module B (e.g. a sound analysis module) 720 and a basic function module C (e.g., a quantization module) 730. The advanced function module may include an advanced function module D (e.g. a pre-filter module) 740, an advanced function module E (e.g. a post-filer module) 750 and an advanced function module F (e.g. a predictor module) 760.

The function module information of the receiving device 50 may include operation information related to operations of a plurality of function modules according to an encoding mode as shown in FIG. 7B in addition to information on the plurality of function modules constituting the codec supported by the receiving device. In other words, in a basic encoding mode, only the basic function module A 710, the basic function module B 720 and the basic function module C 730 may be on. In addition, in an advanced encoding mode, the advanced function module D 740, the advanced function module E 750 and the advanced function module F 760 may be on in addition to the basic function modules 710 to 730.

The first controller 415 may determine an encoding mode based on a function module supported by an encoder of the transmitting device 100, and a function module supported by a decoder of the receiving device 50. Specifically, when at least one of the encoder of the transmitting device 100 and the decoder of the receiving device 50 does not support an advanced function module, (i.e. ①, ②, ③ of FIG. 8), the first controller 415 may set an encoding mode to a basic encoding mode and control the encoder 413 to perform encoding of a data signal by using the basic function modules 710 to 730. However, when both the encoder of the transmitting device 100 and the decoder of the receiving device 50 support an advanced function module (i.e. ④ of FIG. 8), the first controller 415 may set an encoding mode to an advanced encoding mode and control the encoder 413 to perform encoding of a data signal by using the advanced function modules 740 to 760 in addition to the basic function modules 710 to 730.

According to another embodiment of the present disclosure, the first controller 415 may determine an encoding mode based on ID information on the codec supported by the receiving device 50.

The first controller 415 may control the first communicator 411 to receive the ID information on the codec supported by the receiving device 50 in addition to the information on the function module constituting the codec supported by the receiving device 50 while performing pairing. FIG. 9A shows codec specific information the transmitting device 100 receives during a pairing operation. As shown in FIG. 9A, the codec specific information may include not only a field representing various information related to the codec, but also a filed 910 representing the ID information related to the codec and a field 920 representing the function module information related to the codec. For example, when the field 910 representing the ID information related to the codec is "1", it may represent that the type of codec is an audio codec of basic sound quality (48 kHz/16 bit), and when the field 910 representing the ID information related to the codec is "2", it may represent that the type of codec is an audio codec of high sound quality (48 kHz/16 bit or more). FIG. 9B shows fields representing on/off states of a function module according to an encoding mode.

When the received ID information on the codec is a predetermined first ID (e.g. an ID representing a basic sound quality codec), the first controller 415 may determine an encoding mode as a first mode (e.g. a normal sound quality mode) regardless of whether a basic function module and an advanced function module are supported, and when the received ID information on the codec is a predetermined second ID (e.g. an ID representing a high sound quality codec), the first controller 415 may determine an encoding mode as one of the first and second modes depending on whether the basic function module and the advanced function module are supported. The basic function module may be a function module for encoding basic sound quality audio and the advanced function module may be a function module for encoding high sound quality audio.

When the received ID information on the codec indicates that a codec is a HD codec, the first controller 415 may determine an encoding mode as a basic sound quality mode regardless of function module information. However, when the received ID information on the codec indicates that a codec is a high sound quality codec, the first controller 415 may analyze the function module supported by the receiving device 50 and the transmitting device 100. As a result of analysis, when both the receiving device 50 and the transmitting device 100 support a function module for encoding/decoding high sound quality audio (e.g. in the case where 96 kHz flag is on in the field 920 indicating function module information), the first controller 415 may switch to a high sound quality mode and control the encoder 413 to perform encoding by using an advanced function module. However, as a result of analysis, when at least one of the receiving device 50 and the transmitting device 100 does not support a function module for encoding/decoding high sound quality audio (i.e. in the case where 96 kHz flag is off in the field 920 indicating the function module information), the first controller 415 may switch to a basic sound quality mode and control the encoder 413 to perform encoding by using a basic function module for encoding an audio signal of basic sound quality (e.g. an HD audio signal).

Figure 10:
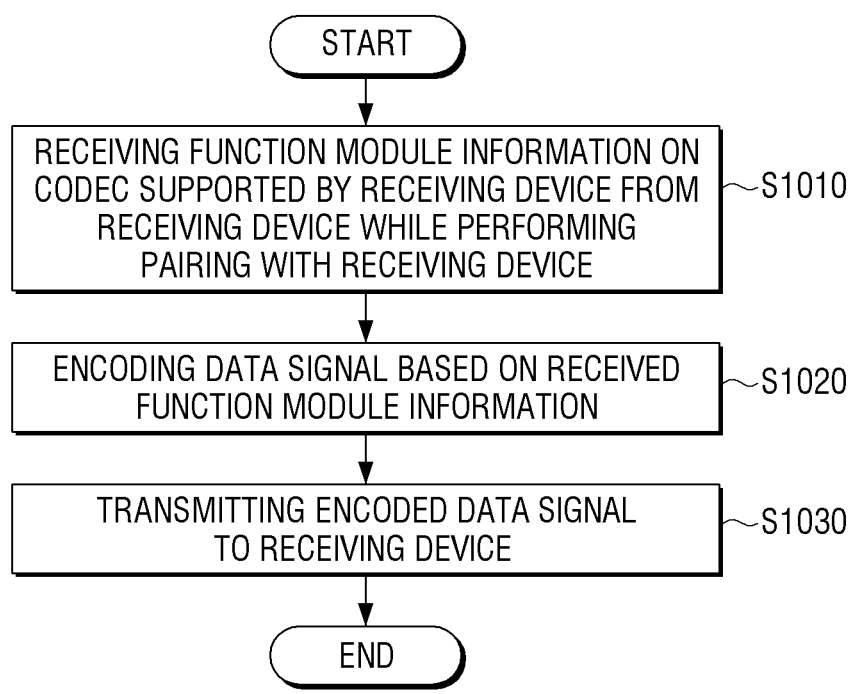
FIG. 10 is a flowchart provided to explain a controlling method for a transmitting device according to an embodiment of the present disclosure.

Hereinafter, a method for controlling the transmitting device 100 according to an embodiment of the present disclosure will be described with reference to FIG. 10.

The transmitting device 100 may receive function module information on a codec supported by the receiving device 50 from the receiving device 50 while performing pairing with the receiving device 50 at step 1010. The function module information may be included in codec specific information, and the function module information may include at least one of information related to a plurality of function modules constituting the codec supported by the receiving device 50 and operation information of operations of the plurality of function modules according to an encoding mode.

The transmitting device 100 may encode a data signal based on the received function module information at step S1020. The transmitting device 100 may select a function module used for encoding or an encoding mode based on information on the function module supported by the receiving device 50. Such feature has been described in detail with reference to FIGS. 5 to 9B. Therefore, the repetition will be omitted.

The transmitting device 100 may transmit the encoded data signal to the receiving device 50 at step S1030.

Figure 11:
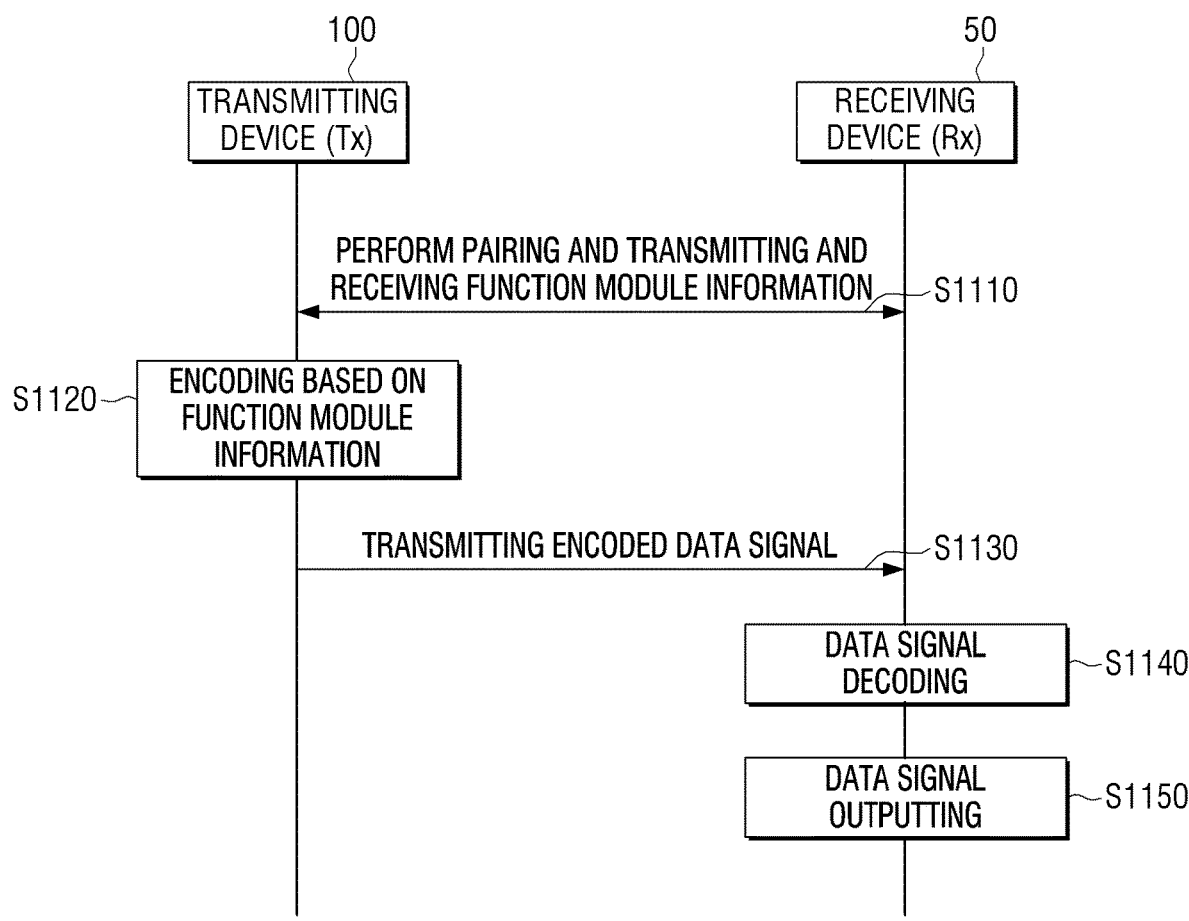
FIG. 11 is a sequence view provided to explain a controlling method for a multimedia system according to an embodiment of the present disclosure.

FIG. 11 is a sequence view provided to explain a method for providing a data signal of a multimedia system according to an embodiment of the present disclosure.

The transmitting device 100 and the receiving device 50 may perform pairing and transmit and receive function module information at step 1110. In other words, the transmitting device 100 may receive function module information supported by the receiving device 50, and the receiving device 50 may receive function module information supported by the transmitting device 100.

The transmitting device 100 may perform encoding of a data signal based on the function module information of the receiving device 50 at step S1120. Such feature has been described with reference to FIGS. 5 to 9B. Therefore, the repetition will be omitted.

The transmitting device 100 may transmit the encoded data signal to the receiving device 50 at step S1130. The transmitting device 100 may transmit the data signal encoded in a streaming format.

The receiving device 50 may perform decoding of the received data signal at step S1140. The receiving device 50 may perform decoding by using the same function module as a function module the transmitting device 100 uses for performing encoding.

The receiving device 50 may output the decoded data signal at step S1150. When the data signal is an audio signal, the receiving device 50 may output the audio signal through a speaker, and when the data signal is an image signal, the receiving device 50 may output the image signal through a display.

According to various embodiments as described above, a transmitting device may grasp function module information on a codec supported by a receiving device and encode a data signal, thereby enhancing compatibility between the transmitting device and the receiving device and providing an audio signal of high sound quality.

According to another embodiment, as described above, by receiving the codec specific information including the function module information during a pairing operation, the transmitting device 100 may change a codec and encode a data signal without an addition pairing operation although transmission environment is changed.

The transmission environment of the transmitting device 100 may be changed while a data signal is encoded by using a codec for providing high sound quality and transmitted to the external receiving device 50. For example, when the transmitting device 100 and the receiving device 50 perform communication using a Bluetooth module, in response to the transmitting device 100 accessing a region where there are a number of Wi-Fi signals or Bluetooth signals using a 2.4 GHz band, an interference phenomenon may occur and audio may be disconnected. As another example, when a plurality of receiving devices are connected to the transmitting device 100, a bandwidth for the transmitting device 100 to transmit a data signal to a specific receiving device may be reduced, resulting in audio discontinuity.

When the transmission environment is changed while the transmitting device 100 encodes a data signal by using a codec for providing high sound quality (e.g. UHQ sound quality) and transmits the encoded data signal to the external receiving device 50 (e.g. in the case where a bandwidth for transmitting the encoded data signal is reduced to a value less than or equal to a predefined value), the transmitting device 100 may change a codec for encoding a data signal to a codec for providing normal sound quality (e.g. HD sound quality) and encode a data signal and transmit the encoded data signal to the external receiving device 50 through the codec for providing normal sound quality.

Figure 13:
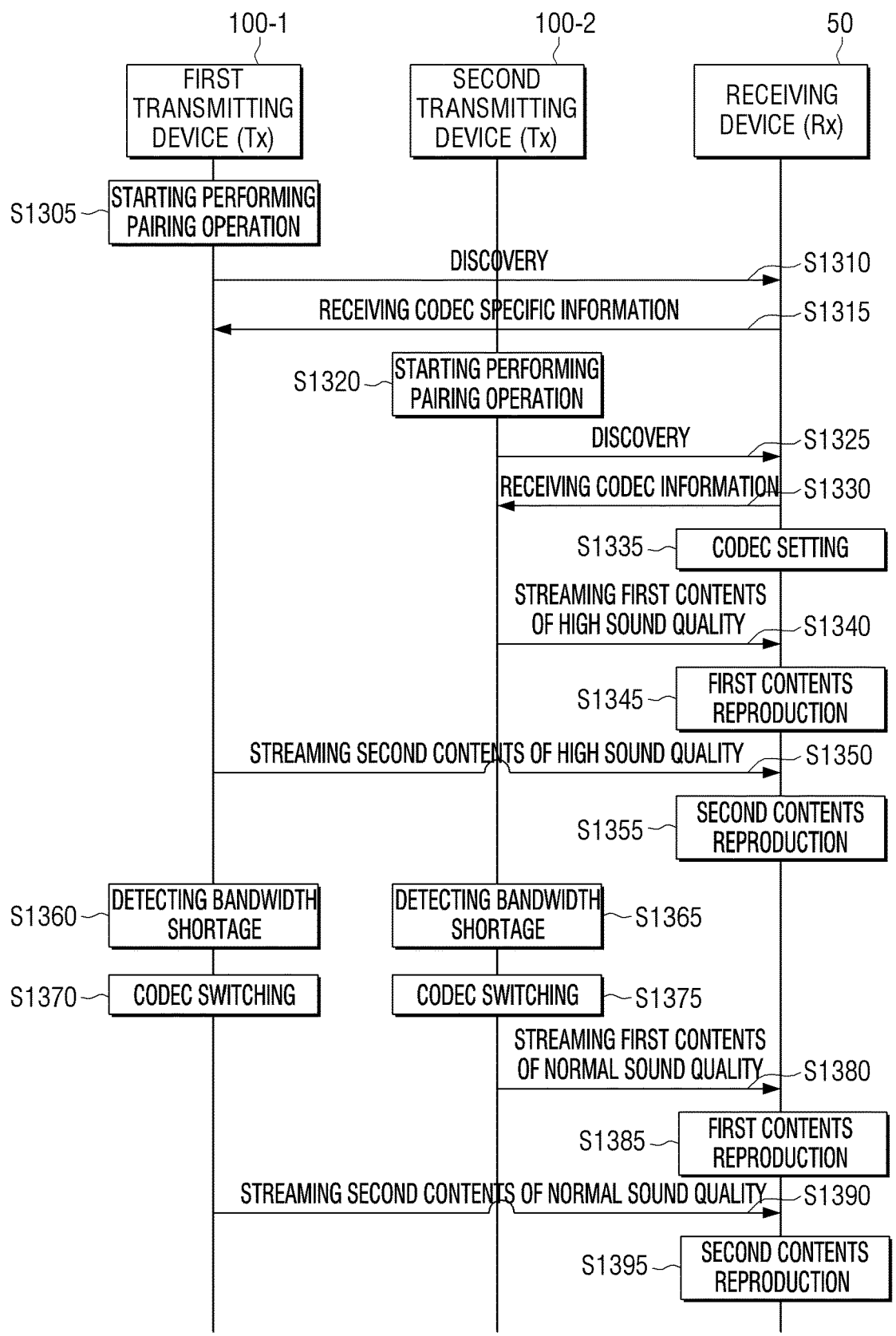
FIG. 13 is a sequence view provided to explain a controlling method for a multimedia system including a plurality of transmitting devices according to another embodiment of the present disclosure.

Hereinafter, a controlling method of the multimedia system 10 when the transmission environment of the transmitting device 100 is changed will be described with reference to FIG. 13 according to an embodiment of the present disclosure.

The transmitting device 100 may perform pairing at step S1205. The transmitting device 100 may discover the receiving device 500 through a Stream End Point Discovery procedure at step S1210.

The transmitting device 100 may receive codec specific information from the discovered receiving device 50 at step S1215. The codec specific information may be included in pairing information, and the codec specific information may include information on the codec supported by the receiving device 50 (e.g. ID information of the codec, function module information of the codec and information on whether the codec is switched).

The transmitting device 100 may determine a codec for encoding a data signal based on the received codec specific information at step S1220. When the receiving device 50 is determined to support a first codec for providing high sound quality thorough the received codec specific information, the transmitting device 100 may set the first codec for providing high sound quality (e.g. UHQ sound quality) to a codec for encoding a data signal.

The transmitting device 100 may' receive a replay command of first contents at step S1225.

The transmitting device 100 may perform a stream configuration procedure for connecting a streaming channel that transmits and receives a data signal at step S1230. Through such the procedure, the transmitting device 100 may provide information of the codec set to the receiving device 50.

The receiving device 50 may perform a stream establishment procedure for ensuring a streaming channel at step S1235. The transmitting device 100 may perform an Open procedure for connecting a streaming channel that transmits media stream to between the transmitting device 100 and the receiving device 50.

The transmitting device 100 may perform encoding of contents by using a first codec at step S1240 and streaming the encoded contents to the receiving device 50 at step S1245. The receiving device 50 may perform decoding of the contents by using the first codec at step S1250 and reproduce the decoded contents at step S1225.

The transmitting device 100 may detect a transmission environment change while encoding and streaming the contents by using the first codec at step S1260. Detecting a transmission environment change may indicate that a bandwidth for transmitting contents is reduced to a predetermined value or less, but the present disclosure is not limited thereto.

In response to detecting the transmission environment change, the transmitting device 100 may perform a stream configuration procedure again to connect a streaming channel that transmits and receives a data signal at step S1265. Through this process, the transmitting device 100 may provide information on the changed codec to the receiving device 50. The changed codec may be a second codec for providing normal sound quality (HD sound quality).

The receiving device 50 may perform a stream establishment procedure for ensuing a streaming channel at step S1270.

The transmitting device 100 may perform encoding of contents by using a second codec at step S1275, and streaming of the encoded contents to the receiving device 50 at step S1280. The receiving device 50 may perform decoding of the contents by using the second codec at step S1285 and reproduce the decoded contents at step S1290.

As described above, in response to detecting a transmission environment change while the codec for providing high sound quality is used, the transmitting device 100 may change a codec for encoding a data signal to a codec for providing normal sound quality and transmit the data signal to the receiving device 50. The transmitting device 100 may change a codec without an additional pairing process although a bandwidth is reduced. Therefore, the transmitting device 100 may continually provide contents to the receiving device 50.

The above-described embodiment shows changing a codec when a transmission environment is changed, but the present disclosure is not limited thereto. The technical spirit of the present disclosure will be applied to the case of providing first audio contents of high sound quality and then second audio contents of normal sound quality.

The above-described embodiment shows that audio contents are provided, but the present disclosure is not limited thereto. The technical spirit of the present disclosure could be applied to the case of transmitting a video. As an embodiment of the present disclosure, the transmitting device 100 such as a smartphone may transmit video contents to the receiving device 50 such as a wearable watch. For example, the smartphone may transmit a screen of the smartphone to a wearable watch, a video of time right before an important event to the wearable watch, or a webpage browsing in the smartphone to the wearable watch. The transmitting device 100 may use a different method for compressing video data according to an available bandwidth and provide the data to the receiving device 50.

The above described embodiment shows encoding data by switching a code, but when multiple connections are supported (i.e. when communication is available in a plurality of frequency bandwidths), the data signal encoded by using a plurality of codecs may be transmitted through the multiple connections. For example, the data signal encoded by using a first codec may be transmitted to a first frequency bandwidth, and the data signal encoded d by using a second codec may be transmitted to a second frequency bandwidth. The transmitting device 100 may select one of the first and second frequency bandwidths based on the transmission environment and transmit the data signal.

According to another embodiment, the receiving device 50 may receive and process data signals from the plurality of transmitting devices 100. For example, an audio device of a modern vehicle (i.e. a receiving device of the present disclosure) may be connected to a plurality of smartphones and audio provided from the plurality of smartphones may be provided to the respective seats (e.g. a driver's seat, a passenger's seat and a rear seat). In other words, a user in the driver's seat may be provided with audio for navigation through a first transmitting device, a user in the passenger's seat may be provided with audio for music contents through a second transmitting device and a user in the rear seat may be provided with audio for film contents through a third transmitting device. As such, when the plurality of transmitting device 100 transmit data signals to a single receiving device 50, the bandwidth shortage may be detected. Therefore, the plurality of transmitting devices 100 may select a codec based on the bandwidth for transmitting the encoded data and perform encoding of the data signal.

Hereinafter, a method for controlling a multimedia system including transmitting devices 100-1 and 100-2 will be described with reference to FIG. 13 according to an embodiment of the present disclosure.

The first transmitting device 100-1 may perform a pairing operation at step S1305. The first transmitting device 100-1 may discover the receiving device 50 through a Stream End Point Discovery procedure at step S1310.

The first transmitting device 100-1 may receive codec specific information from the discovered receiving device 50 at step S1315. The codec specific information may be included in pairing information and the codec specific information may include the information related to the codec supported by the receiving device 50 (e.g. ID information of the codec, function module information of the codec and the like).

The second transmitting device 100-2 may perform a pairing operation at step S1320. The second transmitting device 100-2 may discover the receiving device 50 through a Stream End Point Discovery procedure at step S1325.

The second transmitting device 100-2 may receive the codec specific information from the discovered receiving device 50 at step S1315.

Figure 12:
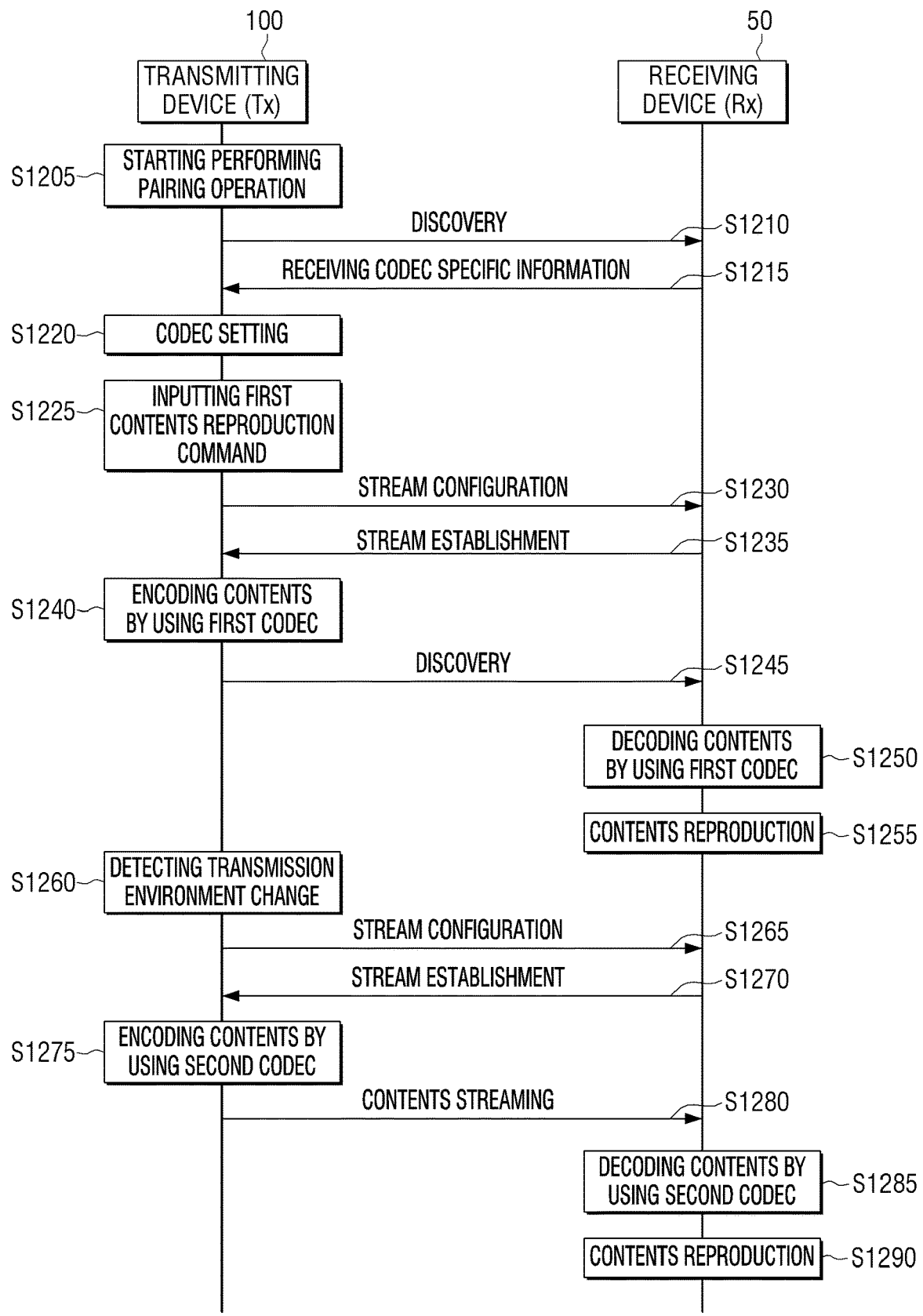
FIG. 12 is a sequence view provided to explain a controlling method for a multimedia system when transmission environment is changed according to another embodiment of the present disclosure.

The receiving device 50 may determine a codec for decoding a data signal through stream configuration and stream establishment procedures as described in FIGS. 2 and 12 at step S1335. The receiving device 50 may set a codec for encoding a data signal to a codec for providing a data signal of high sound quality.

The second transmitting device 100-2 may perform streaming of first contents of high sound quality at step S1340 and the receiving device 50 may reproduce the streamed first contents at step S1345. The first transmitting device 100-1 may perform streaming of second contents of high sound quality at step S1350 and the receiving device 50 may reproduce the streamed second contents at step S1355.

The first transmitting device 100-1 and the second transmitting device 100-2 may detect a bandwidth shortage while the first and second contents are reproduced by the receiving device 50 at steps S1360 and S1365. For example, when there is a newly added transmitting device or there are many other wireless signals, a bandwidth may be reduced due to the interference phenomenon and thus, the bandwidth for transmitting contents may be insufficient.

The first transmitting device 100-1 and the second transmitting device 100-2 may switch a codec at steps S1370 and S1375. The first transmitting device 100-1 and the second transmitting device 100-2 may switch a codec from a codec for encoding a data signal to a codec for providing a data signal of normal sound quality.

The second transmitting device 100-2 may perform streaming of the first contents of normal sound quality at step S1380, and the receiving device 50 may reproduce the streamed first contents at step S1385. The first transmitting device 100-1 may perform streaming of second contents of normal sound quality at step S1390, and the receiving device 50 may reproduce the streamed second contents at step S1395.

Meanwhile, in the above-described embodiment, it has been described that the transmitting device 100 obtains the codec specific information during the pairing process. However, the present disclosure is not limited thereto, but the codec specific information may be obtained by using an additional wireless transmission packet. Specifically, when the transmitting device 100 and the receiving device 50 perform communication using Bluetooth Low Energy (BLE), the receiving device 50 may broadcast an advertising packet for pairing. The advertising packet may include the codec specific information, and the transmitting device 100 may confirm the information on the codec supported by the receiving device 50 by using the codec specific information included in the advertising packet.

FIG. 14 is a sequence view provided to explain a controlling method for a multimedia system according to another embodiment of the present disclosure.

The receiving device 50 may transmit the advertising packet including the codec specific information at step S1405. The receiving device 50 may transmit the codec specific information in a broadcasting method.

The transmitting device 100 may determine a codec based on the codec specific information included in the advertising packet at step S1410.

Step S1415 to step 1480 of changing a codec by sensing a transmission environment change by the transmitting device 100 and the receiving device 50 are the same as step S1225 to step S1290 of FIG. 12, the repetition will be omitted.

The above-described method may be implemented as a program in a computer, and implemented in a general-purpose digital computer that operates the program using a computer-readable recording medium. In addition, the structure of the data used in the above-described method may be recorded on a computer-readable recording medium through various means. The computer readable recording medium includes a storage medium such as a magnetic storage medium (e.g., ROM, floppy disk, hard disk, etc.), optical recording medium (e.g., CD ROM, DVD, etc.), and the like.

Although exemplary embodiments have been shown and described, it will be appreciated by those skilled in the art that changes may be made to these exemplary embodiments without departing from the principles and spirit of the present disclosure. Accordingly, the scope of the present disclosure is not construed as being limited to the described exemplary embodiments, but is defined by the appended claims as well as equivalents thereto.

What is claimed is:

1. A method for a transmitting device that transmits an encoded data signal to a receiving device, the method comprising:
   receiving function module information with regard to a codec supported by the receiving device from the receiving device while performing pairing with the receiving device, wherein the function module information comprises at least one of information related to a plurality of function modules constituting the codec supported by the receiving device and operation information related to operations of the plurality of function modules according to an encoding mode, wherein the plurality of function modules constituting the codec supported by the receiving device comprise at least one of a basic function module for a first function and an advanced function module for the first function;
   identifying a function module commonly supported by the transmitting device and the receiving device based on the function module information;
   encoding a data signal based on the identified function module; and
   transmitting the encoded data signal to the receiving device.

2. The method as claimed in claim 1, wherein the encoding further comprises selecting at least one of determined function modules based on user settings, a status of the transmitting device and a type of content, and encoding the data signal based on the selected function module.

3. The method as claimed in claim 1, wherein the determining comprises: in response that both the receiving device and the transmitting device include the advanced function module, determining the encoding mode as a first mode for performing encoding by using the advanced function module, and in response that at least one of the receiving device and the transmitting device do not include the advanced function module, determining the encoding mode as a second mode for performing encoding by using the basic function module.

4. The method as claimed in claim 1, wherein the receiving comprises receiving ID information with regard to the codec supported by the receiving device from the receiving device along with the function module information, and wherein the determining comprises determining the encoding mode based on the received ID information with regard to the codec.

5. The method as claimed in claim 4, wherein the determining further comprises: in response that the received ID information with regard to the codec is a predetermined ID, determining the encoding mode as one of a first mode and a second mode depending on whether the basic function module and the advanced function module are supported.

6. The method as claimed in claim 1, further comprising:
   in response that a bandwidth for transmitting the encoded data signal is reduced to a predetermined value or less while the data signal encoded by using a first codec is transmitted to the receiving device, encoding the data signal by using a second codec; and
   transmitting the data signal encoded by using the second codec to the receiving device.

7. The method as claimed in claim 6, wherein the first codec is a third codec for providing UHQ sound quality, and the second codec is a fourth codec for providing HD sound quality.

8. The method of claim 1, wherein the function module information further comprises information related to capability of the receiving device for performing a specific function with regard to encoding or decoding, and the specific function is one of a pre-filter function, a post-filter function, a predictor function, a transform function, and a quantization function.

9. A transmitting device for transmitting an encoded data signal to a receiving device, comprising:
   a communicator configured to perform communication with the receiving device;
   an encoder configured to encode a data signal; and
   a controller configured to:
   control the communicator to receive function module information with regard to a codec supported by the receiving device from the receiving device while performing pairing with the receiving device, wherein the function module information comprises at least one of information related to a plurality of function modules constituting the codec supported by the receiving device and operation information related to operations of the plurality of function modules according to an encoding mode, wherein the plurality of function modules constituting the codec supported by the receiving device comprise at least one of a basic function module for a first function and an advanced function module for the first function, identify a function module commonly supported by the transmitting device and the receiving device based on the function module information, control the encoder to encode the data signal based on the identified function module, and control the communicator to transmit the encoded data signal to the receiving device.

10. The transmitting device as claimed in claim 9, wherein the controller is further configured to:

select at least one of determined function modules based on user settings, a status of the transmitting device and a type of content, and control the encoder to encode the data signal based on the selected function module.

11. The transmitting device of claim 9, wherein the function module information further comprises information related to capability of the receiving device for performing a specific function with regard to encoding or decoding, and the specific function is one of a pre-filter function, a post-filter function, a predictor function, a transform function, and a quantization function.

* * * * *